INVENTORS
MAHLON L. LOVE &
LAVERNE ANDERSON, Jr.
BY
John M. Nolan
ATTORNEY

INVENTORS
MAHLON L. LOVE &
LAVERNE ANDERSON, Jr.
BY
John M. Nolan
ATTORNEY

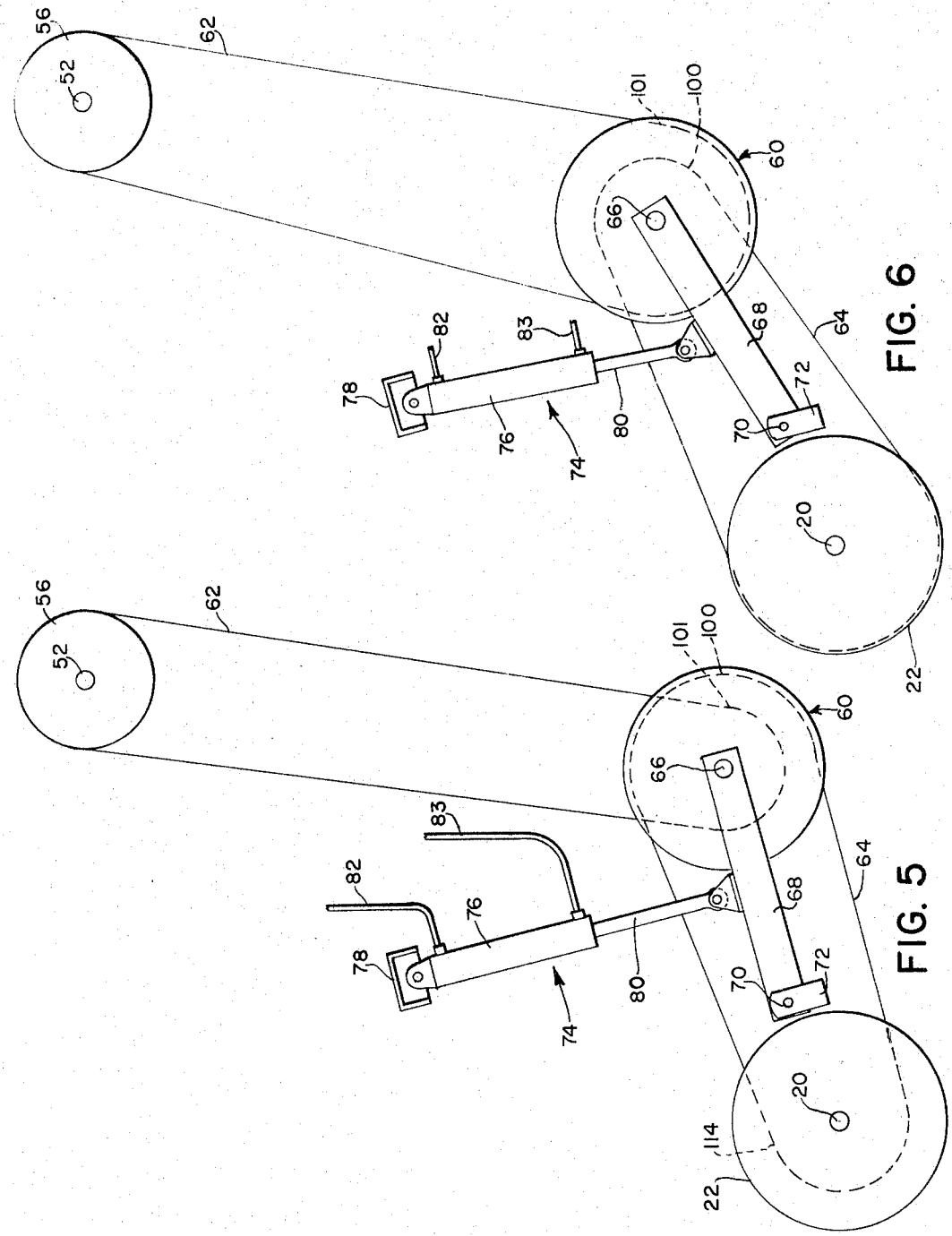

United States Patent Office 3,295,384
Patented Jan. 3, 1967

3,295,384
VARIABLE SPEED BELT DRIVE FOR A VEHICLE
Mahlon L. Love, Osco, and La Verne Anderson, Jr., New Windsor, Ill., assignors to Deere & Company, Moline, Ill., a corporation of Delaware
Filed Dec. 23, 1964, Ser. No. 420,595
12 Claims. (Cl. 74—230.17)

The invention relates to self-propelled vehicles and more particularly to an improved infinitely variable speed belt drive.

Although the invention may readily be utilized on different types of self-propelled agricultural machines such as combines, cotton pickers, tractors, or the like, it will be described herein for use on a self-propelled combine on which it has particular utility.

Such a self-propelled combine conventionally has an engine which drives an infinitely variable speed belt drive which, in turn, drives a conventional change-speed transmission through which the traction wheels of the combine are driven. The engine also directly drives the harvesting, crop handling and threshing mechanisms, and therefore must be operated at a substantially constant speed to provide for maximum efficiency of such mechanisms.

Since crop density varies widely, the ground speed of the combine must be varied to provide the optimum flow of grain to the threshing mechanism, the variation in ground speed being preferably accomplished by the infinitely variable belt drive, rather than the change-speed gear transmission in which the number of speeds is limited to the number of gear combinations.

Present variable speed belt drives, such as described in U.S. Patent No. 2,639,569, issued on May 26, 1953, have a fixed-diameter drive sheave on a fixed shaft, a fixed-diameter driven sheave on a fixed shaft, and a conventional pair of coaxial intermediate sheaves having inversely variable diameters and carried by a shiftable shaft, the movement of this shaft relative to the fixed shafts determining the diameter of the sheaves and consequently the drive ratios. In such an arrangement, the path of the movable shaft is critical, since the distance between the shafts must change the correct amount to compensate for the change in sheave diameters to maintain proper belt tension.

Although, theoretically, the speed of such a belt drive is widely variable, it has been found that in use on combines, for example, the variation has been limited to the ratio of approximately 2.6 to 1, since the drive will not transmit a sufficient force and the belt will not wear properly if the lesser diameter of the variable sheave is too small. It has also been found that if the groove angle, which determines the change in diameter for a given axial movement of the variable sheave face, is less than 26°, the sheave will not transmit sufficient force.

Most field work with present combines is done at ground speeds between 2 and 5½ miles per hour. However, the 2.6 to 1 variation ratio does not quite cover this speed range and accordingly, it is necessary to change gears to cover the entire operating range. In addition, it is necessary to have a relatively large number of gear combinations in the change-speed transmission to provide a sufficiently high over-the-road speed.

The present invention overcomes these objections by providing a variable speed belt drive wherein the driven sheave also has a variable pitch diameter in addition to the intermediate inversely variable diameter sheaves. This allows a substantial increase in the variation ratio without radically changing the belt speeds, or decreasing the groove angle, or the diameter of the sheaves. In addition, the path of the intermediate shaft is no longer critical, since the variable diameter of the driven sheave is spring loaded to maintain proper belt tension.

Accordingly, the primary object of the present invention is to provide an improved variable speed belt drive having a wider output speed range. A more specific object is to provide such increased range by making the pitch diameter of the driven sheave variable in addition to having a pair of inversely variable-diameter coaxial intermediate sheaves on a movable shaft, in a four sheave belt drive.

Another object is to provide such wider range without affecting the stresses in the belt or decreasing the force-transmitting ability of the drive.

Another object is to provide such a belt drive capable of varying the combine speed over the entire range of usual field operating speeds without shifting the combine change-speed transmission.

Another object is to reduce the number of gear combinations necessary in the change-speed transmission for a given range of ground speeds.

Another object is to provide such a belt drive wherein the direction of movement of the intermediate sheave shaft is not critical.

Another important feature of the invention resides in the means for biasing the movable sheave face toward the opposite face in the variable pitch driven sheave. Such variable pitch sheaves are conventionally biased by an axial compression spring around the sheave shaft, exerting an axial force on the movable sheave face and urging it toward the opposite sheave face. However, such a spring is necessarily large for transmission of the relatively large forces involved in a combine drive and, in addition, it exerts an unequal force at different positions in the operating range. Moreover, such a spring is not balanced and consequently is subject to harmonic vibrations at high-speed rotation. The present invention provides a plurality of compression springs equally spaced around the periphery of the movable sheave face and canted toward the sheave axis at such an angle that the springs exert a relatively constant thrust throughout the operating range.

Accordingly, another object of the invention is to provide improved biasing means for a variable pitch sheave.

A more specific object is to provide such biasing means in the form of a plurality of equally spaced compression springs acting against the movable sheave face, equally offset radially from the sheave axis and canted toward said axis.

Another object is to provide such springs which will exert a substantially constant force throughout the operating range and which will not cause a dynamically unbalanced condition in the sheave.

Still another object is to provide such biasing means which are simple to service and maintain.

These and other objects of the invention will become apparent from the following detailed description and accompanying drawings wherein:

FIG. 5 is a schematic view of the variable speed drive with the components positioned for high-speed rotation of the driven sheave.

FIG. 6 is a schematic view similar to FIG. 5 but with the components positioned for low-speed rotation of the driven sheave.

Figure 1:
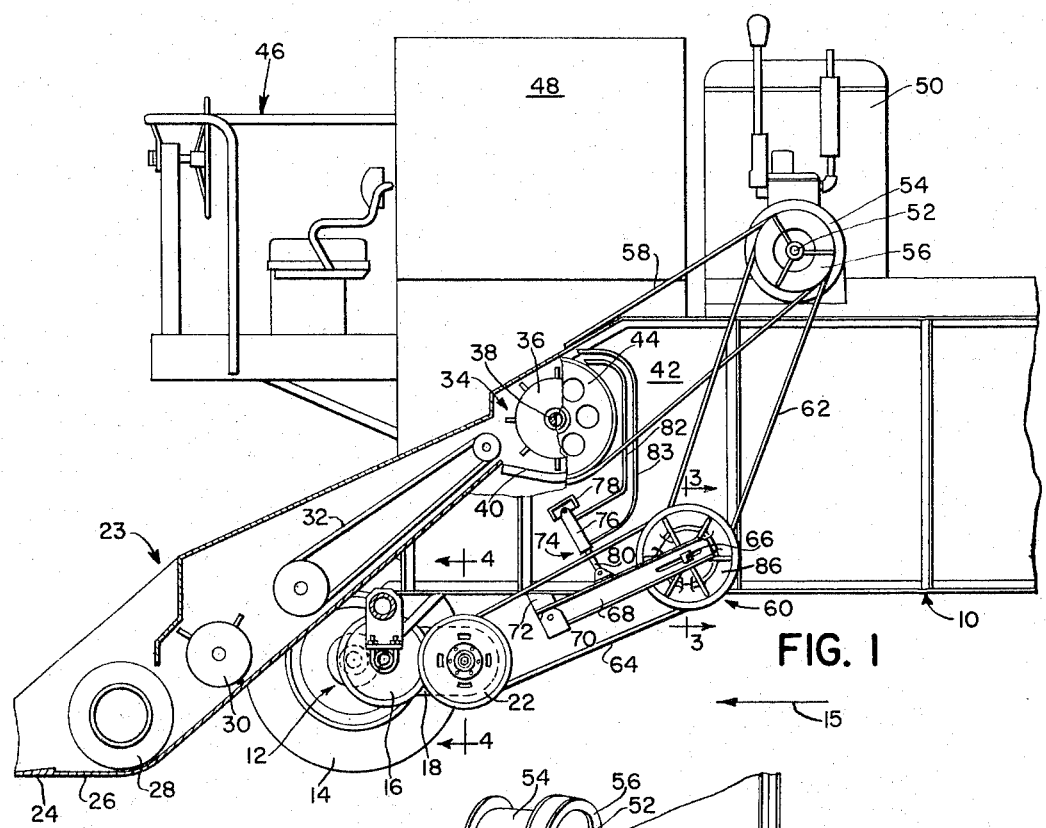
FIG. 1 is a side elevation view, partly in section, of the forward portion of a typical combine, including the combine drive.
Figure 2:
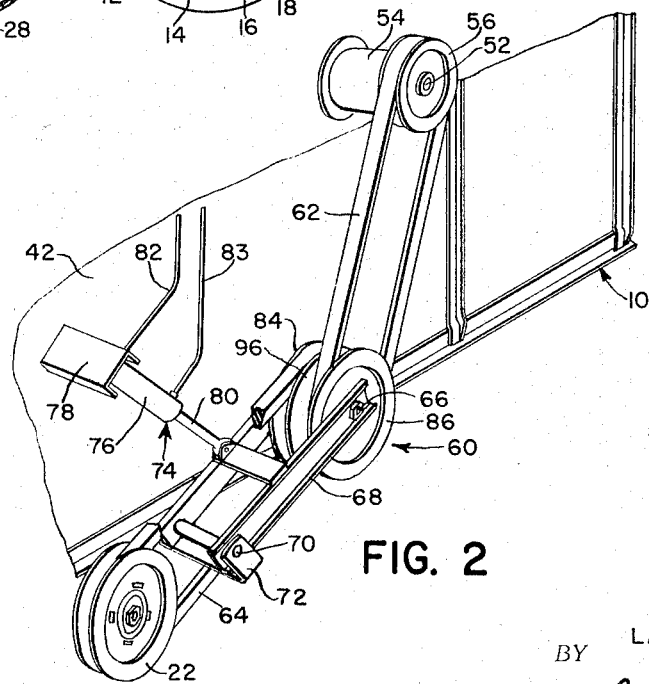
FIG. 2 is a slightly enlarged fragmentary perspective showing the main components of the variable speed belt drive.

Referring now to the drawings, the combine chosen to illustrate the invention comprises a main frame 10 mounted on an axle structure 12 having traction wheels 14 at opposite ends for advance of the main frame over the ground in the direction of the arrow 15, only one of the wheels being shown. The rear portion of the combine is not shown in the drawings; although, it can be appreciated that any conventional rolling support may be utilized at the rear of the main frame 10. It is to be understood that words such as "front," "rear," etc., are mere words of descriptive convenience and are not to be construed as limiting terms.

The axle structure 12 includes a differential gear housing 16 and a transmission housing 18 which contains a conventional change-speed gear mechanism (not shown) shiftable to provide different speed ratios between the traction wheels 14 and a transmission input shaft 20 on which a driven variable pitch V-belt sheave 22 is affixed.

A forwardly extending crop-harvesting means, indicated generally by the numeral 23, is supported by the main frame and includes a transverse cutterbar 24, a platform 26, and a transverse auger 28 for feeding the cut grain rearwardly to a beater 30 which in turn moves the grain to a conveyor 32 which feeds a crop-treating means 34. The crop-treating means includes a cylinder 36 carried on a transverse shaft 38 and an associated concave 40. The shaft 38 extends through a side plate 42 of the main frame and carries a coaxial drive pulley 44 on the exterior side of the side plate, part of the side plate 42 and drive pulley 44 being removed to show a portion of the crop-treating means 34.

The main frame 10 also carries a forwardly disposed operator's station 46 ahead of a grain tank 48. A power source 50, here shown as an internal combustion engine, is also mounted on the main frame 10 and includes a transverse output shaft 52 on which an output pulley 54 and an output V-belt sheave 56 are co-axially affixed. An endless belt 58 moves around the output pulley 54 and the drive pulley 44 for driving the cylinder 36 at a speed in a fixed ratio relative to the engine speed. Additional drive means (not shown) are operatively connected to the drive pulley 44 for driving the crop-harvesting components at a fixed speed ratio relative to the engine speed.

The engine is connected to drive the transmission input shaft 20 and consequently the traction wheels 14 through a variable speed belt drive which includes the V-belt sheave 56 as the drive sheave, the V-belt sheave 22 as the driven sheave, and an intermediate variable drive unit indicated generally by the numeral 60. An endless V-belt 62 interconnects the drive sheave 56 and the variable speed drive unit 60 and a second endless V-belt 64 connects the variable drive unit to the driven sheave 22.

The variable drive unit 60 is journaled on a shaft 66 carried at one end of a lever arm 68 which has its other end rockably mounted on a pivot 70 carried by a frame member 72 attached to the main frame 10. The unit 60 is swingable in a vertical arc about the pivot 70, a control means 74, here shown as a double-acting hydraulic ram having a cylinder 76 attached at one end to a bracket 78 mounted on the side plate 42, a piston acting within the cylinder and having a piston rod 80 pivotally attached to the lever arm 68, and hydraulic lines 82 and 83 communicating with the cylinder on opposite sides of the piston. The control means is preferably actuated by the operator through valve means (not shown) located at the operator's station 46 for regulating the fluid pressure in the hydraulic lines 82 and 83; although, the control means 74 could be automatically actuated if desired.

Figure 3:
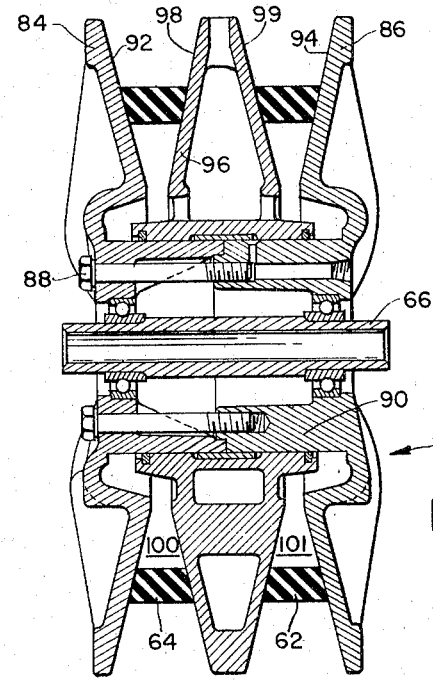
FIG. 3 is an enlarged axial sectional view of the inversely variable intermediate sheaves taken along the line 3—3 of FIG. 1.

The particular variable drive unit chosen for purpose of illustration is shown in detail in FIG. 3 and includes the shaft 66 on which a pair of outer sheave members 84 and 86 are journaled in axially fixed spaced apart relation by a plurality of bolts 88 to form a hub 90 extending between opposite interior radial faces 92 and 94 on the members 84 and 86, respectively. An axially movable intermediate sheave member 96 is slidably mounted on the hub 90 and includes opposite radial faces 98 and 99 which form a pair of V-grooves 100 and 101 of inversely variable diameter in conjunction with the outer member faces 84 and 86 respectively. The V-groove 100 formed by the faces 92 and 98 accommodates the belt 64 and the V-groove 101 formed by the faces 94 and 99 accommodates the belt 62. In FIG. 3, the intermediate member 96 is in its mid-position, and the pitch diameters of the V-grooves are approximately equal.

Figure 4:
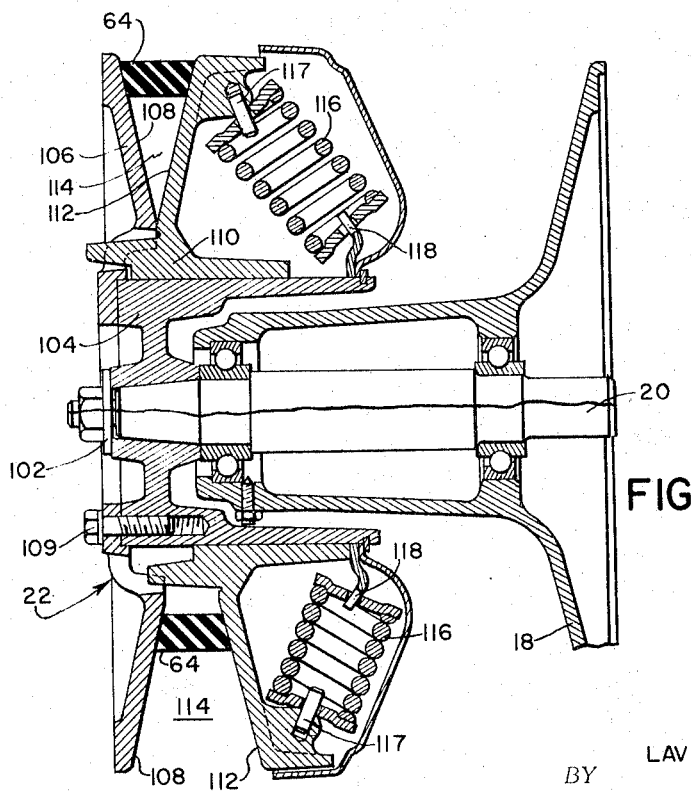
FIG. 4 is an enlarged axial sectional view of the variable pitch driven sheave taken along the line 4—4 of FIG. 1, the upper half of the view showing the sheave at its maximum diameter and the lower half showing the sheave at its minimum diameter.

The detailed construction of the driven variable pitch diameter sheave 22 is shown in FIG. 4, the sheave being keyed to the transmission input shaft 20 and retained thereon by a locking means 102. The sheave 22 includes a hub 104 affixed to the shaft 20 and an axially fixed sheave member 106 having a radial sheave face 108, the fixed sheave member 106 being attached to the hub 104 by a plurality of cap screws 109. A second sheave member 110 is slidably mounted on the hub for axial movement and includes a radial face 112 opposite the sheave face 108 to form a V-groove 114 which accommodates the V-belt 64, the pitch diameter of the groove depending on the axial position of the sheave member 110. The upper one-half of FIG. 4 shows the sheave member 110 positioned against the sheave member 106 for maximum pitch diameter and the lower one-half shows the relative positions of the components for minimum pitch diameter.

A plurality of helical compression springs 116 extend between the hub 104 and the sheave member 110 and axially bias the sheave member toward the sheave member 106, urging the sheave components toward a maximum pitch diameter position. Each spring has one end pivotally mounted to the sheave member 110 by means of a pin 117 for a small amount of rocking movement relative thereto, the point of attachment of each spring being radially offset from the sheave axis the same distance and the springs being spaced at equal intervals around the sheave member 110. The axis of each spring is canted relative to the sheave axis, and the other end of each spring is pivotally attached to the hub by a pin 118 for a small amount of rocking movement relative thereto. As is apparent from the drawings, the angle between the sheave axis and the spring axis is more acute when the spring is partially compressed as in the top one-half of FIG. 4 than when the spring is fully compressed as in the lower one-half of FIG. 4. Thus, although the springs exert a greater force along the spring axis when fully compressed, the component of the force directed along the sheave axis is a smaller proportion of the spring force. Conversely, when the spring is only partly compressed, the force exerted is less but the line of force is more nearly along the sheave axis and a higher proportion of the force is exerted along the sheave axis, thus tending to equalize the biasing force exerted against the sheave member 110 regardless of the spring compression.

The length of the cap screws 109 is such that they can be started while the springs are fully extended, thereby simplifying the assembly and maintenance of the sheave.

Another feature of the springs resides in the fact that they are equally radially offset and equally angularly spaced, and thus the sheave is approximately balanced, as opposed to an axial coil spring which is intrinsically unbalanced and thereby subject to vibrations during high speed rotation of the sheave.

The operation of the variable speed drive is best illustrated in FIGS. 5 and 6. In FIG. 5, the components are shown in a position for maximum output speed, the piston 80 and the control means 74 being fully extended to move the lever arm 68 and the variable drive unit 60 mounted thereon to a position where the distance between the output shaft 52 and the shaft 66 is at a maximum. To accommodate this distance, the belt 62 forces the V-groove 101 to its smallest diameter, the intermediate member 96 moving against the outside member 84, thereby establishing the V-groove 100 at its maximum diameter. Since the belt 64, which moves in the V-groove 100, is forced to its largest diameter at one end, the belt forces V-groove 114 and the variable pitch driven sheave 22 to its smaller diameter at the other end, against the bias of the springs 116. The force exerted by the springs 116 provides the necessary belt tension for the belt 64, the belt tension urging the intermediate member 96 toward the outside member 86, thereby providing tension in the belt 62.

To reduce the output speed, the piston 80 is retracted in the cylinder 76, moving the lever arm 68 and consequently the shaft 66 toward the sheave 56 to decrease the distance between the shafts 52 and 66 and consequently increasing the diameter of the V-groove 101 and inversely decreasing the diameter of the V-groove 100.

The direction of movement of the shaft 66 is not critical, since the springs 116 adjust the diameter of the V-groove 114 to maintain proper belt tension at any diameter. However, it is desirable that the distance between the shafts 20 and 66 does not increase substantially when the distance between the shafts 52 and 66 decreases since an increasing distance would at least partially utilize the belt length available as a result of the decrease in diameter of the V-groove 100, limiting the diameter change of the V-groove 114.

When the piston 80 retracts to the position shown in FIG. 6, the variable drive is established for maximum output speed, the V-groove 101 being at its maximum diameter and the V-groove 100 consequently being at its minimum diameter, whereby the springs 116 establish the V-groove 114 at its maximum diameter.

When the variable speed drive is utilized on a combine, as previously described, with the drive sheave 56 being connected to the output shaft 52 of the engine and the driven sheave 22 being connected to the input shaft 20 of a conventional change-speed transmission, the operator selects the speed range by means of the transmission and varies the speed within the selected range by means of the variable speed drive.

In the harvesting operation, the engine and consequently the crop-harvesting and crop-treating means are operated at a constant speed. The change-speed transmission is set for advance of the combine at a field-operating speed. If the crop is light, the operator actuates the control means 74 to increase the speed of the driven sheave 22 relative to the engine output speed, thereby increasing the ground speed of the combine to provide a heavier flow of the crop material. Conversely, if a heavier crop stand is encountered, the operator actuates the control means 74 to decrease the speed of the driven sheave relative to the engine speed, thereby decreasing the ground speed to decrease the flow of the crop material. The change-speed transmission is designed to provide a proper combine speed for average crop conditions with the variable speed drive unit in a median position. Thus, with the wider speed change ratio in the variable speed drive, the travel speed can be increased or reduced for almost all crop conditions without changing the transmission setting.

Although the variable speed drive and the variable diameter sheave have particular utility in a combine, it is to be understood that the particular driven sheave could be utilized on other variable speed arrangement, and the variable speed drive could also be utilized to drive other types of vehicles and implements. Moreover, other features and advantages of the present invention will readily occur to those skilled in the art, as will many modifications and alterations in the preferred embodiment of the invention described herein, all of which may be achieved without departing from the spirit and the scope of the invention.

What is claimed is:

1. A variable speed V-belt drive comprising a first sheave having a fixed pitch diameter, a second sheave having a variable pitch diameter and disposed at a fixed distance from the first sheave, a support movable between the sheaves, a double sheave including a pair of coaxial sheaves having inversely variable pitch diameters journaled on the support for rotation in unison, control means operably connected to and for selectively moving the support for establishing the position of the double sheave relative to the first and second sheaves, a first endless drive means drivingly connecting the first sheave to one of the inversely variable coaxial sheaves and operative to change the double sheave diameters in response to movement of the support, and a second endless drive means drivingly connecting the second sheave to the other inversely variable sheave and operative to change the second sheave diameter in response to a change in the double sheave diameters.

2. The invention defined in claim 1 wherein the second sheave includes a fixed sheave member, a hub, a movable sheave member slidably mounted on the hub to vary the sheave diameter and a plurality of compression springs acting between the hub and the movable member for biasing the members toward one another, the compression springs being equally spaced angularly and radially offset on the movable member the same distance.

3. The invention defined in claim 2 wherein the compression springs are helical springs and the axis of each spring is canted toward the sheave axis away from the movable sheave member end of the spring.

4. A variable speed V-belt drive comprising support means, a first shaft journaled in the support means, a first sheave having a fixed pitch diameter coaxially mounted on the first shaft for rotation therewith, a second shaft journaled in the support means and parallel to the first shaft, a second sheave coaxially mounted on the second shaft for rotation therewith and including opposite radial sheave members one of which is axially movable relative to the other to form a V-groove of variable diameter and spring means acting on the movable sheave member biasing it toward the opposite sheave member, a lever arm pivotally mounted on the support means for movement in a plane transverse to said shaft axes, a shaft carried by said lever arm parallel to said first shaft, a pair of adjacent sheaves having inversely variable pitch diameters coaxially mounted on said shaft for rotation in unison, a first drive means connecting the first sheave to one of the inversely variable sheaves, a second drive means connecting the second sheave to the other inversely variable sheave, and control means acting between the supporting structure and the lever arm for selectively moving the lever arm and thereby establishing the position of the coaxial inversely variable sheaves relative to the first and second sheaves, the drive means changing the pitch diameters of the variable diameter sheaves in response to movement of the lever arm and the sheaves mounted thereon.

5. The invention defined in claim 4 wherein the second sheave includes a hub on which the movable sheave member is slidably mounted and the spring means comprises a plurality of compression springs acting between the hub and the movable member, the compression springs being equally spaced angularly and radially offset on the movable member the same distance.

6. A variable pitch diameter sheave comprising a hub, a fixed sheave member having a radial face and coaxially attached to the hub for rotation therewith, a movable sheave member coaxially mounted on the hub portion for axial movement relative thereto and having a radial face opposite the fixed member radial face forming a V-groove decreasing in diameter as the movable member moves away from the fixed diameter, and a plurality of compression springs acting between the hub and the movable member for biasing the movable member toward the fixed member, the springs being spaced at equal intervals around the sheave axis and being radially offset the same distance from the sheave axis.

7. The invention defined in claim 6 wherein the compression springs are helical springs and the axis of each spring is canted toward the sheave axis away from the movable sheave member end of the spring.

8. The invention defined in claim 6 wherein the springs are similar and have one end pivotally connected to the movable sheave member and the other end pivotally connected to the hub whereby the springs compress or expand when the sheave member moves axially, the springs swinging about the hub end in an axial plane.

9. In a self-propelled harvester of the type having a main frame carried on traction means for advancing the main frame over the ground, a power source mounted on the main frame including a power output shaft, a change speed transmission for transmitting power to the traction means and including a transmission output shaft, a variable speed V-belt drive connecting the power output shaft to the transmission input shaft comprising a drive sheave having a fixed pitch diameter coaxially mounted on the power output shaft for rotation therewith, a variable pitch diameter driven sheave coaxially mounted on the transmission input shaft for rotation therewith and including opposite radial sheave members one of which is axially movable relative to the other to form a V-groove having a pitch diameter varying with said movement and also including spring means acting on the movable sheave member biasing it toward the opposite sheave member, a support mounted on the frame for movement between said sheaves, a pair of coaxial intermediate sheaves journaled on the support for rotation in unison and having inversely variable pitch diameters, the support being shiftable on the frame to vary the distances between the intermediate sheaves and the drive and driven sheaves, control means operably connected to the support for shifting the support, a pair of drive means respectively drivingly connecting the drive sheave to one intermediate sheave and the driven sheave to the other intermediate sheave and effecting changes in the intermediate and driven sheave diameters in response to shifting of said support.

10. The invention defined in claim 9 wherein the spring means comprise a plurality of helical compression springs equally spaced around the sheave axis and radially offset the same distance on the movable sheave member, the axis of each spring being canted toward the sheave axis.

11. In a self-propelled harvester of the type having a main frame carried on traction means for advancing the main frame over the ground, a power source mounted on the main frame including a power output shaft, a change-speed transmission for transmitting power to the traction means and including a transmission input shaft parallel to the power output shaft, the combination therewith of a variable speed V-belt drive connecting the power output shaft to the transmission input shaft comprising a drive sheave having a fixed pitch diameter coaxially mounted on the power output shaft for rotation therewith, a variable pitch diameter driven sheave coaxially mounted on the transmission input shaft for rotation therewith and including opposite radial sheave members one of which is axially movable relative to the other to form a V-groove having a pitch diameter varying with said movement and spring means acting on the movable sheave member biasing it toward the opposite sheave member, a lever arm pivotally mounted on the frame for movement in a plane transverse to the power output shaft, a shaft carried by said lever arm parallel to the power output shaft, a pair of adjacent intermediate V-belt sheaves having inversely variable pitch diameters coaxially mounted on said lever arm shaft for rotation in unison, control means acting between the frame and the lever arm for selectively shifting the lever arm and thereby establishing the distance between the intermediate sheaves and the drive and drive sheaves, a first endless V-belt drivingly trained around the drive sheave and an intermediate sheave and effecting a change in the intermediate sheave diameters in response to said shifting of the lever arm, and a second endless V-belt drivingly trained around the driven sheave and the other intermediate sheave and effecting a change in the driven sheave diameter in response to a change in the intermediate sheave diameters.

12. The invention defined in claim 11 wherein the driven sheave includes a hub, the fixed sheave member being coaxially attached to the hub, the movable sheave member being axially slidable on the hub, and the spring means comprising a plurality of helical compression springs equally spaced around the sheave axis and having one end attached to the hub and the other end radially offset the same distance and attached to the movable sheave member, each spring axis being canted away from the movable sheave member toward the sheave axis at the same angle.

References Cited by the Examiner
UNITED STATES PATENTS

| | | | |
|---|---|---|---|
| 2,639,569 | 5/1953 | Pasturczak | 74—230.17 X |
| 2,678,566 | 5/1954 | Oehrli | 74—230.17 |
| 2,881,624 | 4/1959 | Cardona | 74—230.17 |
| 2,900,832 | 8/1959 | Snartemo | 74—230.17 |

DAVID J. WILLIAMOWSKY, *Primary Examiner.*

L. H. GERIN, *Assistant Examiner.*